(12) United States Patent
Bendel

(10) Patent No.: US 12,529,742 B2
(45) Date of Patent: Jan. 20, 2026

(54) SYSTEM AND METHOD FOR IMAGING TISSUE

(71) Applicant: Aspect Imaging Ltd., Shoham (IL)

(72) Inventor: Peter Bendel, Rishon LeZion (IL)

(73) Assignee: Aspect Imaging Ltd., Shoham (IL)

( * ) Notice: Subject to any disclaimer, the term of this patent is extended or adjusted under 35 U.S.C. 154(b) by 0 days.

(21) Appl. No.: 16/446,965

(22) Filed: Jun. 20, 2019

(65) Prior Publication Data

US 2019/0391221 A1    Dec. 26, 2019

Related U.S. Application Data

(60) Provisional application No. 62/687,513, filed on Jun. 20, 2018, provisional application No. 62/723,703, filed on Aug. 28, 2018.

(51) Int. Cl.
    *G01R 33/56*      (2006.01)
    *A61B 5/00*      (2006.01)
    (Continued)

(52) U.S. Cl.
    CPC ........ *G01R 33/5608* (2013.01); *A61B 5/0042* (2013.01); *A61B 5/055* (2013.01);
    (Continued)

(58) Field of Classification Search
    CPC .... A61B 5/0042; A61B 5/055; G01R 33/243; G01R 33/56; G01R 33/5602;
    (Continued)

(56) References Cited

U.S. PATENT DOCUMENTS 5,268,640 A    12/1993    Du
5,450,010 A    9/1995    Van Der Meulen
(Continued)

FOREIGN PATENT DOCUMENTS

JP    H0630909 A    2/1994
JP    H07323021    12/1995
(Continued)

OTHER PUBLICATIONS

Allkemper, T., et al. "Study of susceptibility-induced artefacts in GRASE with different echo train length." European Radiology 8.5 (1998): 834-838. (Year: 1998).*
(Continued)

*Primary Examiner* — Rishi R Patel
(74) *Attorney, Agent, or Firm* — LOEB & LOEB LLP

(57) ABSTRACT

Systems and methods of detecting a portion within tissue that has a variation of local magnetic susceptibility using an MRI device, including: transmitting a first spin-echo pulse sequence to the tissue, wherein the first spin-echo pulse sequence includes a first number of refocus pulses and a first TE value; transmitting a second spin-echo pulse sequence to the tissue, wherein the second spin-echo pulse sequence includes a second number of refocus pulses and a second TE value; obtaining a first image and a second image; determining one or more locations within the second image having a signal intensity that is different than the signal intensity of the same one or more locations within the first image; and identifying a portion of tissue that has a varied local magnetic susceptibility based on the determined one or more locations within the second image.

32 Claims, 8 Drawing Sheets

(51) Int. Cl.
  *A61B 5/055* (2006.01)
  *G01R 33/561* (2006.01)
  *G01R 33/565* (2006.01)

(52) U.S. Cl.
  CPC ..... *G01R 33/5602* (2013.01); *G01R 33/5617* (2013.01); *G01R 33/56536* (2013.01)

(58) Field of Classification Search
  CPC ........ G01R 33/56563; G01R 33/56536; G01R 33/5615; G01R 33/5617; G01R 33/4828
  See application file for complete search history.

(56) References Cited

U.S. PATENT DOCUMENTS

| | | | |
|---|---|---|---|
| 6,011,392 A | 1/2000 | Zhou | |
| 6,150,815 A | 11/2000 | Janzen | |
| 6,771,069 B2 | 8/2004 | Asano | |
| 8,593,141 B1 | 11/2013 | Radparvar | |
| 9,041,393 B2 | 5/2015 | Warntjes | |
| 2002/0149366 A1 | 10/2002 | Asano | |
| 2003/0006770 A1* | 1/2003 | Smith | F23C 7/06 324/309 |
| 2004/0056660 A1* | 3/2004 | Yatsui | G01R 33/4828 324/309 |
| 2007/0249929 A1 | 10/2007 | Jeong | |
| 2007/0265520 A1* | 11/2007 | Posse | G01R 33/56509 600/410 |
| 2011/0221439 A1* | 9/2011 | Posse | G01R 33/485 324/307 |
| 2013/0137962 A1* | 5/2013 | Urish | A61B 5/7264 600/410 |
| 2013/0178734 A1 | 7/2013 | Wald | |
| 2014/0296695 A1 | 10/2014 | He | |
| 2014/0300353 A1* | 10/2014 | He | G01R 33/5607 324/309 |
| 2015/0077102 A1 | 3/2015 | Mandal | |
| 2015/0301136 A1* | 10/2015 | Li | G01R 33/5613 324/309 |
| 2016/0321424 A1 | 11/2016 | Otvos | |
| 2018/0011158 A1* | 1/2018 | Katscher | G01R 33/243 |
| 2018/0017652 A1* | 1/2018 | Ye | G01R 33/5608 |
| 2019/0087688 A1* | 3/2019 | Peng | G06K 9/6223 |
| 2019/0137590 A1* | 5/2019 | Paul | G01R 33/5608 |

FOREIGN PATENT DOCUMENTS

| | | |
|---|---|---|
| JP | H07327952 | 12/1995 |
| JP | H11033012 | 2/1999 |
| JP | 2010158459 A | 7/2010 |
| JP | 2014087442 | 7/2024 |

OTHER PUBLICATIONS

Bartha, Robert, et al. "In vivo 1H2O T measurement in the human occipital lobe at 4T and 7T by Carr-Purcell MRI: Detection of microscopic susceptibility contrast." Magnetic Resonance in Medicine: An Official Journal of the International Society for Magnetic Resonance in Medicine 47.4 (2002): 742-750. (Year: 2002).*

Gruetter, Rolf. "Automatic, localized in vivo adjustment of all first-and second-order shim coils." Magnetic resonance in medicine 29.6 (1993): 804-811. (Year: 1993).*

Questions and Answers in MRI, "Spin Echo (SE)", <https://mriquestions.com/spin-echo1.html> (Year: 2024).*

Questions and Answers in MRI, "Grase", <https://s.mriquestions.com/grase.html> (Year: 2024).*

McKay, Lachlan, "Spin echo sequences", Radiopaedia <https://radiopaedia.org/articles/spin-echo-sequences?lang=us> (Year: 2024).*

Fellner, Franz, et al. "Comparison of spin-echo MR pulse sequences for imaging of the brain." American journal of neuroradiology 18.9 (1997): 1617-1625. (Year: 1997).*

Questions and Answers in MRI, "Magnetism: Causes of Susceptibility", <https://s.mriquestions.com/causes-of-susceptibility.html> (Year: 2024).*

Brown et al., "Magnetic Resonance Imaging: Physical Principles and Sequence Design," Second Edition, John Wiley & Sons, 2014, 978 pages.

Oshio et al., "GRASE (Gradient- and Spin Echo) Imaging: A Novel Fast MRI Technique," Magnetic Resonance in Medicine 20, 1991, pp. 344-349, 6 pages.

Allkemper et al., "Study of susceptibility-induced artefacts in GRASE with different echo train length", European Radiology, 8, pp. 834-838 (1998), https://doi.org/10.1007/s003300050481.

Canadian Notice of Allowance issued in App. No. CA3,047,661, dated Mar. 21, 2022, 1 page.

Canadian Office Action for App. No. CA3,047,661, dated Apr. 26, 2021, 4 pages.

Canadian Office Action for App. No. CA3,047,661, dated Jul. 21, 2020, 4 pages.

H. Carr et al: "Effects of Diffusion on Free Precession in Nuclear Magnetic Resonance Experiments", Physical Review, vol. 94, No. 3, May 1, 1954 (May 1, 1954), pp. 630-638, XP055004628, ISSN: 0031-899X, DOI: 10.1103/PhysRev.94.630.

International Search Report for Application No. EP19181544.8, dated Nov. 19, 2019, 11 pages.

Japanese Office Action (including English translation) for App. No. JP2019-114786, dated Feb. 8, 2022, 4 pages.

Japanese Office Action (with English translation) for App. No. JP2019-114786, dated Mar. 23, 2021, 7 pages.

Japanese Office Action issued Aug. 25, 2020, for App. No. JP2019-114786, 4 pages.

Kim Y B et al: "Positive contrast visualization for cellular magnetic resonance imaging using susceptibility-weighted echo-time encoding", Magnetic Resonance Imaging, Elsevier Science, Tarrytown, NY, US, vol. 27, No. 5, Jun. 1, 2009 (Jun. 1, 2009), pp. 601-610, XP026132142, ISSN: 0730-725X, DOI: 10.1016/J.MRI.2008.10.001 [retrieved on May 21, 2009].

Kim YB, et al., "Positive contrast visualization for cellular magnetic resonance imaging using susceptibility-weighted echo-time encoding". Magn Reson Imaging. Jun. 2009; 27(5):601-10. doi: 10.1016/j.mri.2008.10.001. Author Manuscript from: https://www.ncbi.nlm.nih.gov/pmc/articles/PMC2905816/pdf/nihms208826.pdf.

Robert Bartha et al: "In vivo 1H20 T2+ measurement in the human occipital lobe at 4T and 7T by Carr-Purcell MRI: Detection of microscopic susceptibility contrast", Magnetic Resonance in Medicine., vol. 47, No. 4, Mar. 28, 2002 (Mar. 28, 2002).

Japanese Office Action (including English translation) issued in App. No. JP2019-114786, dated Aug. 29, 2022, 4 pages.

European Patent Office Communication pursuant to Article 94(3) EPC issued in App. No. EP19181544, dated Dec. 19, 2022, 7 pages.

Japanese Office Action issued in App. No. JP2019-114786, dated Feb. 14, 2023, 3 pages.

Brown, Robert W.; Cheng; Yu-Chung N.; Haacke, E. Mark; Thompson, Michael R.; Venkatesan, Ramesh; Magnetic Resonance Imaging: Physical Principles and Sequence Design, Second Edition; 2014; pp. 120-121; John Wiley & Sons, Inc.; Hoboke, New Jersey.

Japanese Office Action dated May 7, 2024 for JP Application No. 2023-131898 with English Translation, 6 pages.

Japanese Office Action dated Dec. 10, 2024 for JP Application No. 2023-131898 with English Translation, 4 pages.

EP Office Action dated Nov. 29, 2024 for EP Application No. 19181544.8, 7 pages.

Chavhan, Govind B.; Babyn, Paul; Thomas, Bejoy; Shroff, Manohar M.; Haacke, E. Mark; Principles, Techniques, and Applications of T2*-based MR Imaging and Its Special Applications, RadioGraphics 2009; 29:1433-1449, Published Online 10.1148/rg.295095034, 20 pages.

* cited by examiner

```
┌─────────────────────────────────────────┐
│ Transmitting, by the MRI device, a first spin- │
│ echo pulse sequence to the tissue, wherein │
│ the first spin-echo pulse sequence comprises │
│ a first number of refocus pulses and a first │
│ echo time (TE) value │
└─────────────────────────────────────────┘
         ⌐210
            ↓
┌─────────────────────────────────────────┐
│ Obtaining, by the MRI device, a first image of │
│              the tissue │
└─────────────────────────────────────────┘
         ⌐220
            ↓
┌─────────────────────────────────────────┐
│ Transmitting, by the MRI device, a second │
│  spin-echo pulse sequence to the tissue, │
│ wherein the second spin-echo pulse sequence │
│  comprises a second number of refocus pulses │
│        and a second TE value │
└─────────────────────────────────────────┘
         ⌐230
            ↓
```

Fig. 2A

SYSTEM AND METHOD FOR IMAGING TISSUE

CROSS REFERENCE TO RELATED APPLICATIONS

This application claims the benefit of U.S. Provisional Ser. Nos. 62/687,513, filed on Jun. 20, 2018 and 62/723,703, filed on Aug. 28, 2018, which are all incorporated in their entirety herein by reference.

FIELD OF THE INVENTION

The invention generally relates to imaging a tissue with a magnetic resonance imaging (MRI) device. More specifically, the invention relates to systems and methods for detection of local susceptibility variations within a tissue using an MRI device.

BACKGROUND

Hemorrhaging in a brain can be paramagnetic, and can have a distinctly different magnetic susceptibility than surrounding tissue. When taking an MRI image of a brain that has a hemorrhage, the hemorrhage typically appears darker (e.g., hypo-intense) on images obtained with a gradient-echo (GRE) sequence having a sufficiently long time (e.g., 10-40 ms) between signal excitation and the occurrence of the detected echo signal (TE) (e.g., T2*weighted images) in comparison to non-hemorrhage areas of the brain due to, for example, the presence of local internal magnetic field gradients at the location of the hemorrhage. However, the mere appearance of hypo-intensity in an MRI image is typically not sufficient for declaring a hemorrhage because other factors can cause the hypo-intensity in the MRI image. For example, a tissue having a short T2 relaxation time (e.g., 100 ms or below) can also appear hypo-intense.

Current methods for determining whether hypo-intense regions in an MRI image are due to a hemorrhage typically include susceptibility-weighted-imaging (SWI). Locations of hemorrhaging can be identified by identifying local phase changes which can indicate paramagnetic centers. Location of hemorrhaging can be identified by sign (e.g., a negative phase), magnitude (e.g., in excess of a predefined value), and/or by spatial frequency (e.g., a change that occurs over small distances). SWI can include combining magnitude of the MRI images obtained with the GRE sequence and phase maps.

One difficulty with SWI for identifying brain hemorrhaging can include the fact that local phase shifts caused by the hemorrhage can be very small (e.g., phase shifts in the order of 10 degrees) in comparison with the phase shifts caused by the non-homogeneous field of the main magnet. Thus, for a MRI acquired in a nonhomogeneous magnetic field, the inhomogeneity of the main magnetic field can hide the local gradients, making it difficult to detect the hemorrhaging. Therefore, it can be desirable to reliably detect local magnetic susceptibility variations within a tissue (e.g., hemorrhaging within a brain).

SUMMARY

Embodiments include detecting a portion within a tissue that has a variation of local magnetic susceptibility using a magnetic resonance imaging (MRI) device, including for example transmitting, by the MRI device, a first spin-echo pulse sequence to the tissue, wherein the first spin-echo pulse sequence includes a first number of refocus pulses and a first echo time (TE) value, obtaining, by the MRI device, a first image of the tissue, transmitting, by the MRI device, a second spin-echo pulse sequence to the tissue, wherein the second spin-echo pulse sequence includes a second number of refocus pulses and a second TE value, obtaining, by the MRI device, a second image of the tissue, determining one or more locations within the second image of the tissue having a signal intensity that is different than the signal intensity of the same one or more locations within the first image of the tissue, and identifying a portion of tissue that has a varied local magnetic susceptibility based on the determined one or more locations within the second image of the tissue.

In some embodiments, the first number of refocus pulses and the second number of refocus pulses are different. In some embodiments, the first TE value and the second TE value are different. In some embodiments, identifying the portion of tissue can include identifying a location within the tissue where an effective TE of the first pulse sequence and second pulse sequence are identical.

In some embodiments, identifying the portion of the tissue can include applying a correction matrix to the first image of the tissue and the second image of the tissue, and wherein the correction matrix is based on at least two calibration images taken using the MRI device. In some embodiments, the first number of refocus pulses is less than the second number of refocus pulses. In some embodiments, the second number of refocus pulses is less than the first number of refocus pulses. In some embodiments, one or more calibration images can be acquired from a phantom which is void of internal susceptibility gradients.

In some embodiments, a correction matrix can be generated based on the one or more calibration images, and the generated correction matrix can be applied on at least one of the first image of the tissue and the second image the second image of the tissue. In some embodiments, the tissue is a brain. In some embodiments, the MRI is a permanent magnet MRI. In some embodiments, the identified portion of the tissue can be transmitted to a display.

In some embodiments, the signal intensity difference between the first image of the tissue and the second image of the tissue can be caused by the strength of local magnetic susceptibility gradients. In some embodiments, an image mask can be generated, the first image of the tissue and the second image of the tissue can be weighted with relaxation time T2, and the image mask can be superimposed on the weighted first image of the tissue and the second image of the tissue.

In some embodiments, at least one of the first spin-echo pulse sequence and the second spin-echo pulse sequence can be a 3-dimensional sequence. In some embodiments, fast spin-echo sequence can be applied to the tissue to obtain a readout of the tissue. In some embodiments, multiple spin-echo pulse sequences can be applied during a predetermined time period prior to applying the fast spin-echo sequence.

Embodiments include a system for detection of a portion within a tissue that has a variation of local magnetic susceptibility, including for example a magnetic resonance imaging (MRI) device, to: transmit a first spin-echo pulse sequence to the tissue, wherein the first spin-echo pulse sequence includes a first number of refocus pulses and a first echo time (TE) value, obtain a first image of the tissue, transmit a second spin-echo pulse sequence to the tissue, wherein the second spin-echo pulse sequence includes a second number of refocus pulses and a second TE value, obtain a second image of the tissue, determine one or more locations within the second image of the tissue having a signal intensity that is different than the signal intensity of the same one or more locations within the first image of the tissue, and identify a portion of tissue that has a varied local magnetic susceptibility based on the determined one or more locations within the second image of the tissue.

Embodiments include a computer program product including instructions which, when the program is executed by a computer, cause the computer to instruct a magnetic resonance imaging (MRI) device to detect a portion within a tissue that has a variation of local magnetic susceptibility, the instructions including for example transmitting, by the MRI device, a first spin-echo pulse sequence to the tissue, wherein the first spin-echo pulse sequence includes a first number of refocus pulses and a first echo time (TE) value, obtaining, by the MRI device, a first image of the tissue, transmitting, by the MRI device, a second spin-echo pulse sequence to the tissue, wherein the second spin-echo pulse sequence includes a second number of refocus pulses and a second TE value, obtaining, by the MRI device, a second image of the tissue, determining one or more locations within the second image of the tissue having a signal intensity that is different than the signal intensity of the same one or more locations within the first image of the tissue, identifying a portion of tissue that has a varied local magnetic susceptibility based on the determined one or more locations within the second image of the tissue.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 2A and 2B show a flow chart of a method to detect a portion within a tissue that has a variation of local magnetic susceptibility, with a MRI device, according to some embodiments of the invention;

Figure 1:
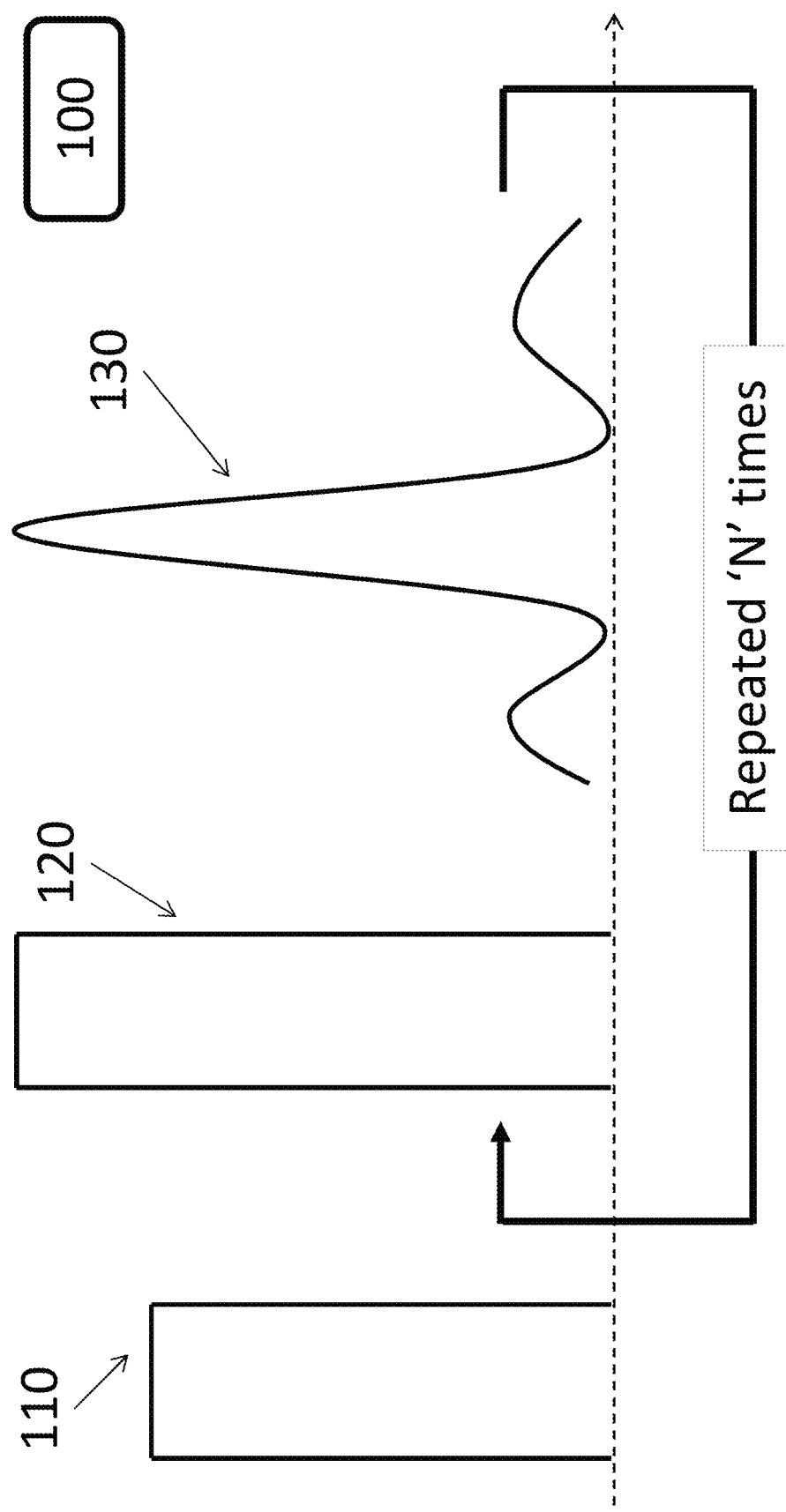
FIG. 1 schematically illustrates a pulse sequence for a spin echo MRI, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. The term "set" when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Advantages of the invention can include an ability to detect local magnetic susceptibility variations within a tissue, for example, local susceptibility caused by a hemorrhage within a brain.

When obtaining an MRI of an object, there can be a spin-echo decay in the object in the presence of a non-uniform magnetic field (e.g., a $B_0$ field). The relaxation time T2 can indicate a decay of a transverse magnetization (e.g., signal intensity vs. echo time (TE)) in spin-echo (SE) pulse sequences. The decay can be exponential, as shown below in equation No. 1:

$$A(TE) = A_0 e^{-TE/T_2}$$ Equation No. 1 where A is a measured signal intensity at an echo time (TE), and $A_0$ is an available signal intensity, which can depend, for example, upon spin density and/or other parameters of the object that the MRI is being taken of and/or the pulse sequence. The parameters and/or variables equation No. 1 can be local values, in other words, they can be functions of the spatial coordinates (x,y,z).

In a spin-echo pulse sequence, the signal can be created by an excitation pulse (e.g., with flip angle of 90°), which can be followed by a series of n (n≥1) refocus pulses (e.g., with a flip angle of 180°). For the sake of simplicity, in one example, the refocus pulses can be assumed to have 180° flip angles. In this example, each of the refocus pulses can create an echo signal. The echo signal can have an intensity that obeys equation No. 1 at each time of occurrence of an echo peak. The echo time (TE) can be time between an excitation pulse and the peak of the echo signal.

Reference is made to FIG. 1, which schematically illustrates a pulse sequence for a spin echo MRI, according to some embodiments of the invention. An excitation pulse 110 can be generated by an MRI device 100, followed by a refocus pulse 120. Once the refocus pulse 120 is generated, the MRI can detect a signal 130. The refocus pulse 120 can be repeated 'N' times, where 'N' is an integer greater than 1. The echo time (TE) can be the time between the excitation pulse and the detected signal. The pulse sequence of FIG. 1 can also form the basis for single-SE pulse sequences, multi-SE pulse sequences, and/or fast-SE (FSE) pulse sequences. For a FSE pulse sequence, each echo can have different phase encoding (in contrast to SE pulse sequences where all echoes experience the same phase-encode gradient), and a single MRI image can be reconstructed from all of the echoes. The contrast in the FSE can be determined by one echo at the center of 'k-space' (e.g., the echo acquired with zero phase-encoding).

The value of the relaxation time T2 can depend on homogeneity of the magnetic field $B_0$ and/or details of the particular pulse sequence that is used for measuring T2. The phenomenon of the spin echo can rely upon the fact that the resonance frequencies of each of the nuclei in the observed volume, between signal excitation and signal refocus pulses, can be identical to the frequencies between the refocus pulses and the formation of the echo. But this condition may not apply if, for example, the nuclei move in a non-uniform $B_0$ field between the two time intervals (e.g., the time intervals being the periods before and after the refocus pulses). In the presence of the nuclei moving (e.g., due to diffusion and/or flow), the signal refocusing can be incomplete, and/or the amplitude of the echo signal can be lower than expected from considering only the value of T2 that occurs absent the nuclei moving (e.g., as can be implied by equation No. 1).

If the diffusion of the nuclear spins in a non-uniform $B_0$ field is taken into account, the equation describing the decay of the echo implied as shown in equation No. 1 can be modified as follows:

$$A_{HE}(TE) = A_0 \exp\left(-\frac{TE}{T_2} - \frac{1}{12}Dg^2(TE)^3\right) \quad \text{Equation No. 2}$$

where "HE" is a 'Hahn Echo', that can indicate that equation No. 2 can describes an echo signal intensity following a single 180° refocus pulse, which can be applied at time TE/2 after the excitation pulse (corresponding to 'N'=1 in FIG. 1). The parameter 'D' is the molecular self-diffusion coefficient, and 'g' is the value of the local field gradient (e.g., assuming that the $B_0$ field variation in space is linear). Neglecting the second term in the exponent of equation No. 2 can result in the decay of the echo intensities being the same as described by equation No. 1. Neglecting the second term can be justified if 'D' and/or 'g' are small, and if the times TE at which the signal is measured are short. However, if the magnitude of the second term is significant (or even dominant), the decay of the echo amplitude may no longer be exponential, and can be strongly affected by local non-uniformities of $B_0$. In various scenarios, 'local non-uniformities of $B_0$' can be due to the inherent field of the magnet and/or field non-uniformities (e.g., from susceptibility gradients in the sample and/or at the sample-air interface).

Another consideration with respect to MRI measurements can be an effect type of nuclei, a molecular environment and/or a temperature on the relaxation time T2. As can be seen by viewing equation No. 2, measuring T2 by creating a single echo signal at varying times can result in inaccuracies in T2 and/or difficulties in obtaining a T2 measurement. In some embodiments, repeating the application of the refocus pulses (e.g., at equal time intervals) can create a series (e.g., or a 'train') of echo signals that can reduce the effect of the second term in equation No. 2. In some embodiments, repeating the application of the refocus pulses can be done in accordance with a 'Carr-Purcell-Meiboom-Gill' (CPMG) echo-train pulse sequence to, for example, measure transverse or spin-spin T2 relaxation times of any nucleus. In these embodiments, multiple echoes at varying values of TE can be detected. In some embodiments, 'N' refocus pulses can be applied to detect and/or measure n echo signals, as indicated, for example, in FIG. 1.

In some embodiments, the contribution of the second term in equation No. 2 can be reduced by increasing the number of refocus pulses as, for example, shown in Equation No. 4, below: let the time interval between successive refocus pulses and refocus echo signals be denoted by IED (inter-echo-delay). The time between the excitation pulse and the first refocus pulse is equal to IED/2. The echo time TE of each of the echoes in the train can be:

$$TE = n(\text{IED}) \quad \text{Equation No. 3}$$

The decay of the echo signal can be given by:

$$A_{CPMG}(TE) = A_0 \exp\left(-\frac{TE}{T_2} - \frac{1}{12}Dg^2\frac{(TE)^3}{n^2}\right) \quad \text{Equation No. 4}$$

As can be seen from equation No. 4, the relative contribution of the second term (which can due to diffusion in local gradients), can be reduced by increasing the number of refocus pulses 'n' within a given TE (which can be equivalent to shortening IED). In some embodiments, where the magnitude of the second term is negligible compared to that of the first term, the relaxation time T2 can be accurately (or substantially accurately) measured from the decay of the signals in the echo train, even when, for example, the field $B_0$ is strongly non-uniform and TE is long. In some embodiments, T2 can be measured with a single signal excitation.

As described above, it can be desirable to create contrast in an MRI image based upon the presence of strong internal field gradients to, for example, detect brain hemorrhaging. It can be desirable to obtain MRI images in which the intensities depend exclusively (or substantially exclusively) on the strength of the local gradients (as represented by 'g'), without being affected (or being substantially effected) by any other factors (such as T1, T2, etc.) and/or to create a mathematical MRI image mask, which can be super-imposed on T2-weighted MRI images to highlight and/or emphasize internal susceptibility gradients. As can be verified in equation No. 4, variations in IED (which can be seen as equivalent to variations in 'n') for embedding different levels of sensitivity to internal gradients into the signal intensities in the MRI images can be used.

In some embodiments, two sets of MRI images are acquired, for which all acquisition parameters (including TE) are the same (or substantially the same), and only the number of refocus pulses (n) is different. In these embodiments, the only differences (or the only substantial differences) between the two MRI image sets is due to the strength of the local magnetic susceptibility gradients.

Figure 2B:
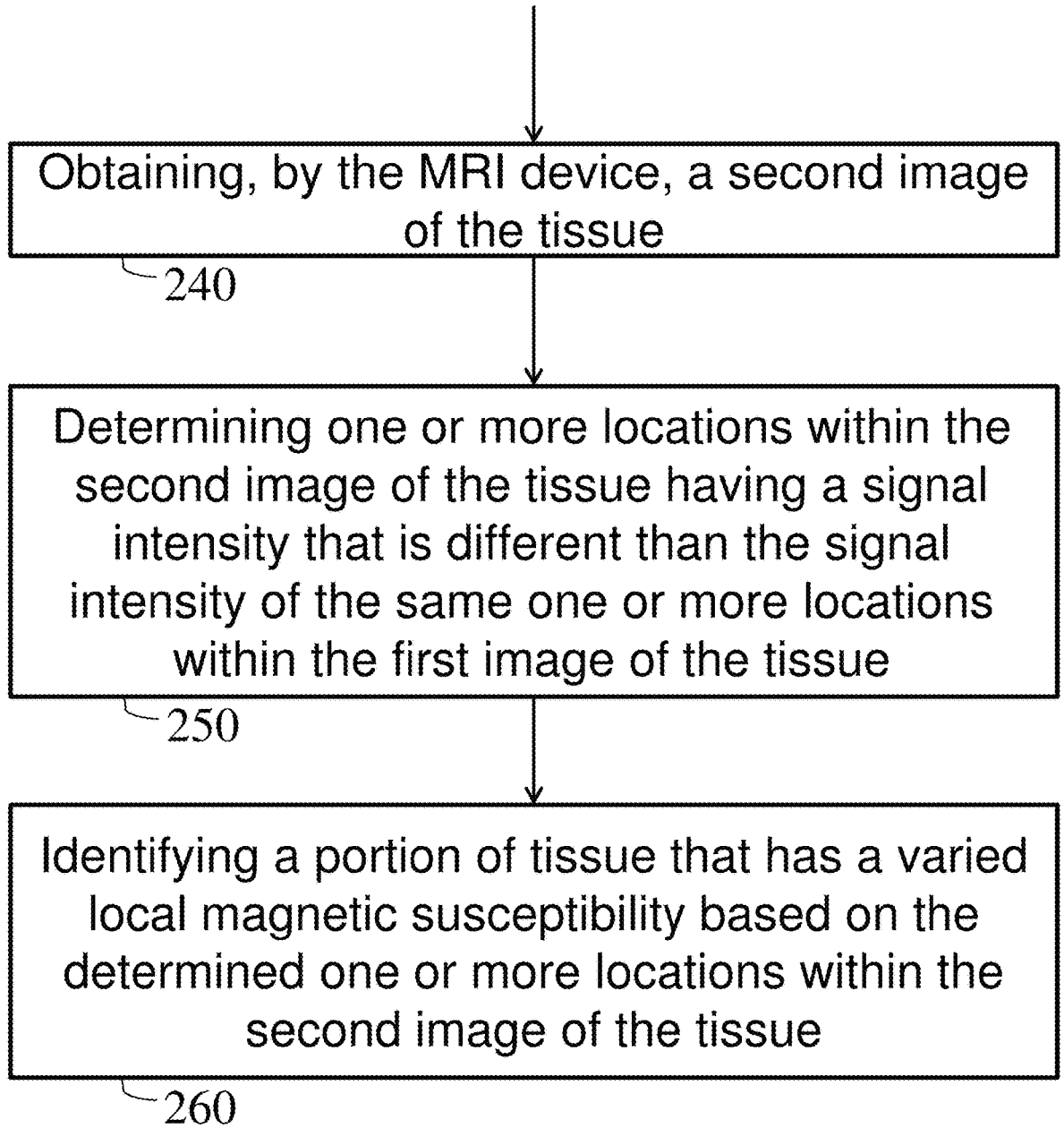

According to some embodiments, an MRI device is used to detect a particular portion of interest within a tissue that has a variation of local magnetic susceptibility, for example to detect brain hemorrhaging. Reference is made to FIGS. 2A-2B, which show a flow chart of a method to detect a portion within a tissue that has a variation of local magnetic susceptibility with an MRI device, according to some embodiments of the invention.

The method involves, transmitting, by an MRI device, a first spin-echo pulse sequence to the tissue, wherein the first spin-echo pulse sequence includes a first number of refocus pulses and a first echo time (TE) value (at Step 210).

The method also involves, obtaining, by the MRI device, a first image of the tissue (at Step 220).

The method also involves, transmitting, by the MRI device, a second spin-echo pulse sequence to the tissue, wherein the second spin-echo pulse sequence includes a second number of refocus pulses and a second echo time (TE) value (at Step 230).

The method also involves, obtaining, by the MRI device, a second image of the tissue (at Step 240). In some embodiments, the first number of refocus pulses and the second number of refocus pulses are different. In some embodiments, the first TE value and the second TE value are different.

The method also involves, determining one or more locations within the second image of the tissue having a signal intensity that is different than the signal intensity of the same one or more locations within the first image of the tissue (at Step 250). The determining can be performed by an MRI device and/or computer processing device.

The method also involves, identifying a portion of tissue that has a varied local magnetic susceptibility based on the determined one or more locations within the second image of the tissue (at Step 260). The identification of the portion of tissue that has local magnetic susceptibility variation can be carried out by detection of algebraic post-processing of the images. The identifying can be performed by an MRI device and/or computer processing device.

In various embodiments, the first spin-echo pulse sequence and/or the second spin-echo pulse sequence is a 3-dimensional sequence, with acquisition matrix 64×64×28, slice thickness equal to 1.5 mm, field-of-view (FOV) equal to 32 mm, TR equal to 400 ms and TE equal to 22.4 ms.

In various embodiments, the first number of refocus pulses is between 1 and 'n', where 'n' is an integer number greater than 1. In various embodiments, the second number of refocus pulses is between 1 and 'm', where m is an integer number greater than 1. In some embodiments, 'n' and 'm' are different. In some embodiments, 'n' is greater than 'm'. In some embodiments, 'm' is greater than 'n'.

In some embodiments, an indicator of the detected local magnetic susceptibility variation within the tissue is transmitted to a display, for example to be viewed by an operator of the MRI device.

In various embodiments, there can be any number of scans (e.g., a first spin-echo sequence, second spin-echo sequency, a third spin-echo sequence, . . . 'n' spin-echo sequence, where 'n' is an integer greater than 1). In these embodiments, for each spin-echo sequence in the 'n' spin-echo sequences, the number of refocus pulses can be any integer value. In these embodiments, for each spin-echo sequence in the 'n' spin-echo sequences, the number of refocus pulses can be different for each of the 'n' spin-echo sequences. In these embodiments, for each spin-echo sequence in the 'n' spin-echo sequences, the TE values can be different for each of the n spin-echo sequences. In these embodiments, a strength of the local magnetic susceptibility gradients can be determined based on non-least-squares fitting, exponential fitting for creating maps of 'effective' T2 or R2 values, Principal Component Analysis (PCA), and/or any mathematical analysis as is known to be suitable in the art.

In some scenarios, because the radio-frequency field during the first and second pulse sequences can lack uniformity, the method can include acquiring calibration MRI images from a object which is void of internal susceptibility gradients at significant levels (e.g., phantom) and using the calibration MRI images to generate a correction matrix that can be applied to each of the MRI images received during the first and second pulse sequences The correction matrix can be dependent upon the particular RF coil used during imaging and on the number of refocus pulses, but typically not on other parameters such as field of view, acquisition matrix, TR and/or TE. The calibration can be performed once for each coil at a range of values for the number of refocus pulses. The radio-frequency field variations are typically not sample dependents such that the calibration may not be repeated for each scanned object.

Figure 3B:
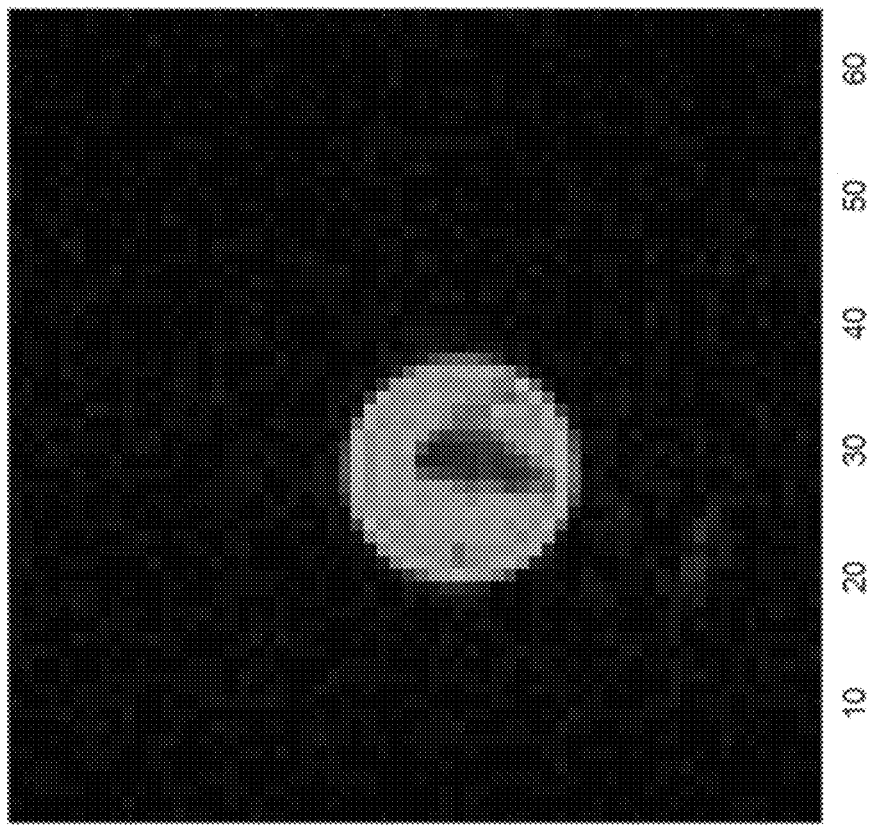
FIGS. 3A and 3B show examples of images of a tissue (e.g., a sample tissue) obtained with a first pulse sequence and a second pulse sequence, with a MRI device, according to some embodiments of the invention.
Figure 3A:
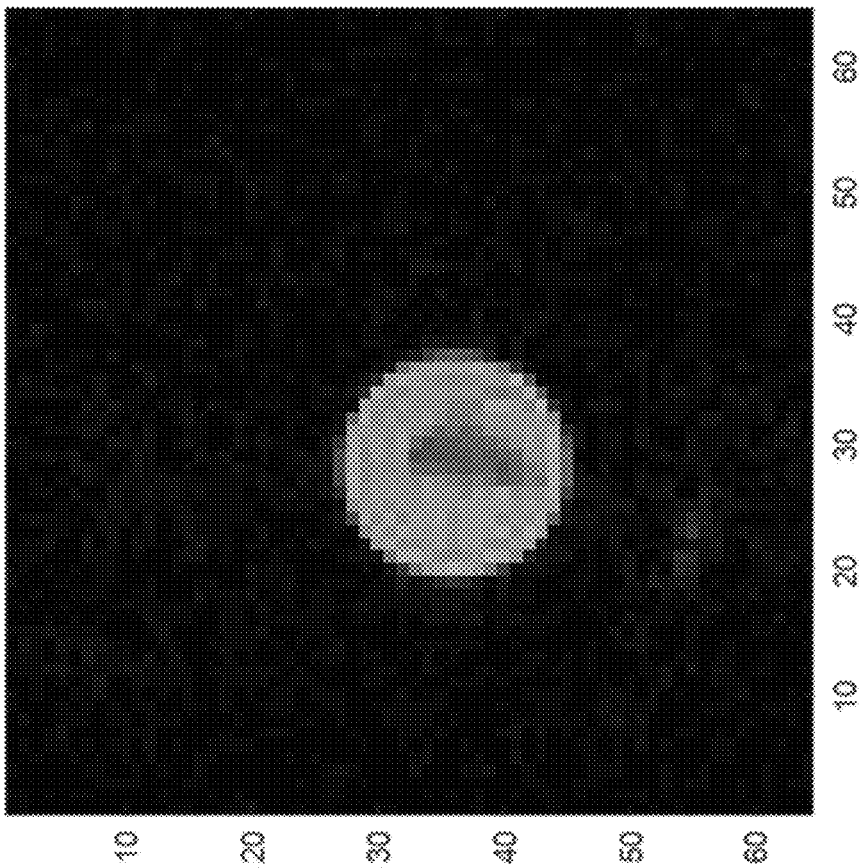

Reference is made to FIGS. 3A-3B, which show examples of MRI images of a tissue (e.g., a sample tissue) obtained with a first pulse sequence and a second pulse sequence scanned on an MRI device (e.g., an MRI device as manufactured by Aspect Imaging), according to some embodiments of the invention. The sample tissue is a phantom contained in a test tube with 37 mm length and 10 mm i.d with a small amount of magnetite gel in a concentration of 44 μg iron oxide powder per ml gel. GRE-derived phase maps on the sample can indicate that the difference in bulk susceptibility between the magnetite and background gels ($\Delta\chi$) is 1.0 ppm. A value of 1.0 ppm can be viewed at a high end of values estimated for certain hemorrhagic lesions, for example compared to $\Delta\chi$ values for hemorrhage being in the range of 0.1-1.5 ppm.

The MRI device can be a permanent magnet MRI device having a field strength at 1.0 Tesla with a vertical $B_0$ field direction (e.g., perpendicular to a long axis of cylindrical sample tubes). The transmit/receive RF coils are solenoids with 35 mm i.d.

In FIGS. 3A and 3B, the MRI images are obtained based on a first and second pulse sequences of a 3-dimensional sequence, an acquisition matrix 64×64×28, slice thickness equal to 1.5 mm, field-of-view (FOV) equal to 32 mm, TR equal to 400 ms and TE equal to 22.4 ms. For FIG. 3A the number of refocus pulses was 'n'=4, and for FIG. 3B the number of refocus pulses was 'm'=1. For the first pulse sequence of FIG. 3A, the inter-echo-delay (IED) is 5.6 ms. FIG. 3A is from the 4th echo in the echo train of the first pulse sequence, therefore its TE=5.6×4=22.4 ms, which is identical to the TE in the second pulse sequence where 'm'=1.

As shown in FIG. 3A and FIG. 3B, the signal intensity of the magnetite gel (in which there are substantial internal gradients) is much lower on the 'n'=1 MRI image (FIG. 3A), compared to the 'n'=4 MRI image (FIG. 3B), while the intensity of the surrounding gel (in which the gradients are much weaker) is practically identical. In this particular example, the signal intensities are quantitatively comparable between the two scans. Thus, an MRI image showing the normalized difference between the two scans (dn), can be defined as:

$$dn = \frac{A_{n'} - A_1}{A_{n'}} \qquad \text{Equation No. 5}$$

Figure 3C:
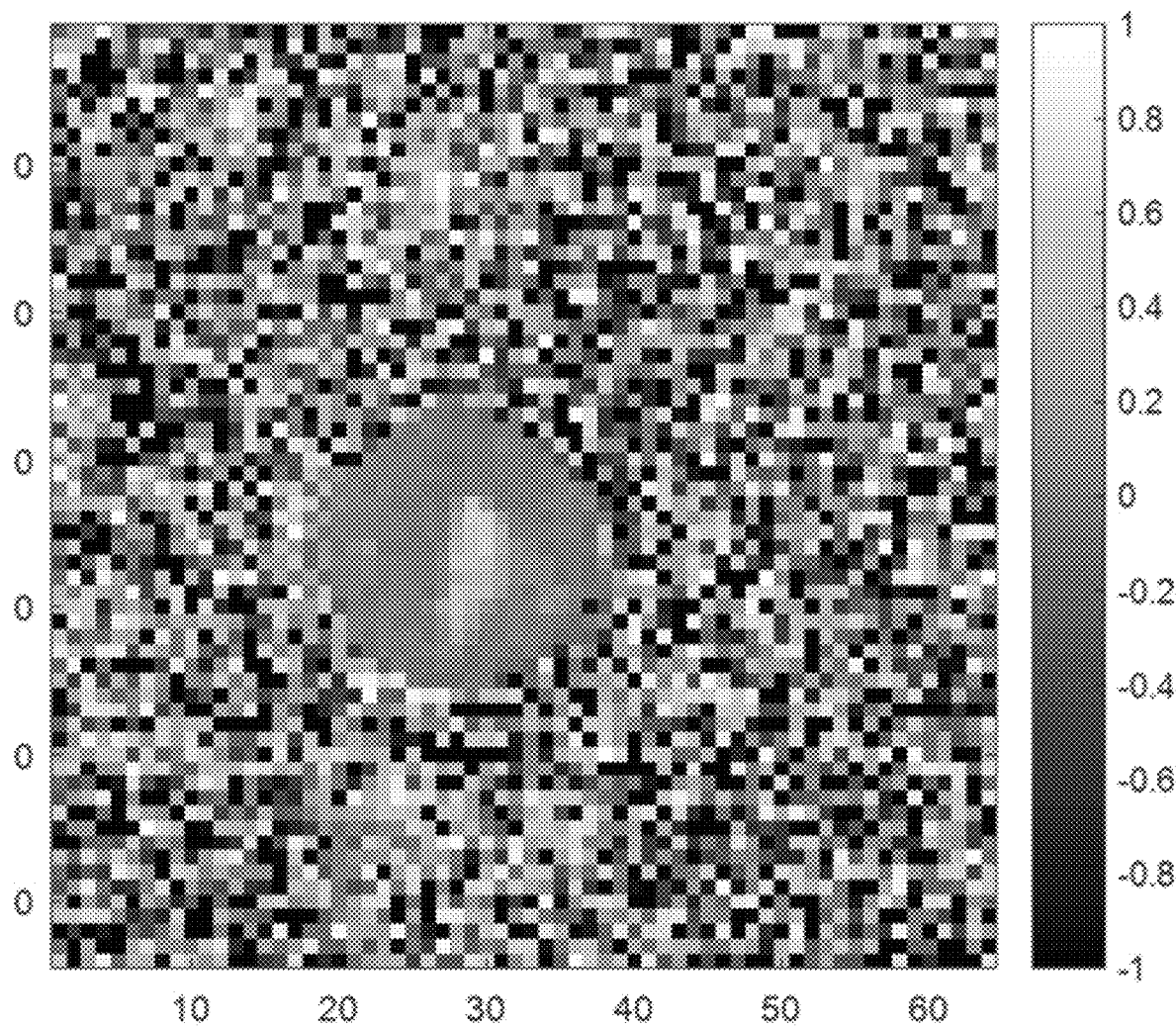
FIG. 3C shows a desired local susceptibility-specific MRI image as determine from the MRI images of FIGS. 3A and 3B, according to some embodiments of the invention.

Reference is made to FIG. 3C, which shows a desired local susceptibility-specific MRI image as determine from the MRI images of FIGS. 3A and 3B, according to some embodiments of the invention. In FIG. 3C, only regions with sufficiently strong internal gradients exhibit dn pixel values (e.g., intensity in a pixel of the MRI image) which are larger than 0, while all other regions, regardless of their tissue type, relaxation times etc., have MRI image intensities which are close to 0 (e.g., within experimental uncertainty).

FIG. 3C shows an example of an MRI image which is fully equivalent to an ideally filtered conventional susceptibility-weighted-imaging (SWI) phase map, with the distinction that SWI typically shows blood vessels and hemorrhage as hypo-intense.

The graph of FIG. 3C is determined by (I4−I1)/I4, where I4 is the intensity of the MRI image of FIG. 3A, and I1 is the intensity of the MRI image from 3B.

In some embodiments, the MRI can generate an MRI image mask and weight the first MRI image of the tissue and the second MRI image of the tissue with relaxation time T2 by superimposing of the MRI image mask on the weighted first MRI image of the tissue and the second MRI image of the tissue.

Figures 4A, 4B:
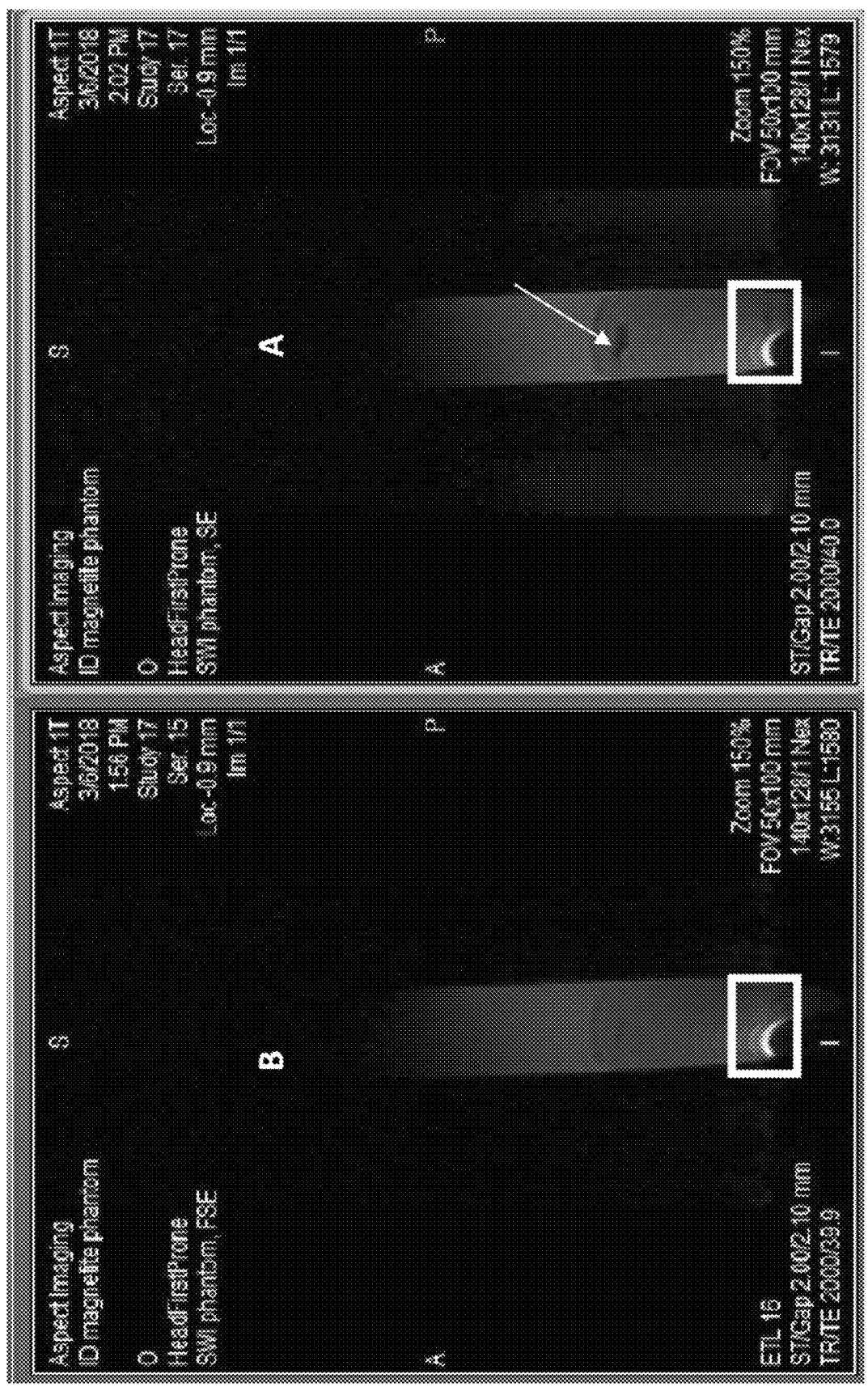
FIGS. 4A and 4B show examples of MRI images of a tissue obtained with a first pulse sequence and a second pulse sequence, with a MRI device, according to some embodiments of the invention.

Reference is made to FIGS. 4A and 4B, which show examples of MRI images of a tissue (e.g., a sample) obtained with a first pulse sequence and a second pulse sequence, according to some embodiments of the invention. The sample includes a phantom positioned within the MRI to be in a region with very poor $B_0$ homogeneity. In this example, the phantom consists of a tube with length of 10 cm, and i.d. of 16 mm. The magnetite gel contains a concentration of 22 μg iron oxide powder per ml gel.

In FIG. 4A, the MRI images are obtained with the first pulse sequence of a 2-dimensional Fast-Spin-Echo sequence, and FIG. 4B the MRI images are obtained with a second pulse sequence of a 2-dimensional Spin-Echo sequence.

The MRI images in FIGS. 4A and 4B are obtained with first and second pulse sequences having slice thickness equal to 2 mm, field-of-view (FOV) equal to 50×100 mm, acquisition matrix=128×140, TR equal to 2000 ms and TE equal to 40 ms. The first pulse sequence includes an echo train length=16, and IED=5.0 ms, and the second pulse sequence includes an echo train length=1 and IED=40 ms. The first pulse sequence has a number of refocus pulses 'n'=8, and the second pulse sequence has a number of refocus pulses 'm'=1. The phase-encode pattern in the first pulse sequence is set such that the center of 'k-space' is acquired at the 8th echo, resulting in an effective TE of 39.9 ms. In some embodiments, identification of the portion of tissue can include identifying a location within the tissue where an effective TE of the first pulse sequence and second pulse sequence are identical.

The magnetite gel appears with distinctly different contrast on the two MRI images, and its intensity is much lower on FIG. 4B compared to FIG. 4A. FIG. 4B shows a lower part of the MRI image (the regions surrounded by the white rectangles), which appears with distortions due to a non-uniformity of the $B_0$ field in this region of the magnet (e.g., caused by higher-order background gradients). The appearance of this region (e.g., in terms of geometry and intensity) is substantially identical in FIG. 4A and FIG. 4B. This can indicate that the magnitude of the background gradients was not big enough to cause a significant effect and the presence of the magnetite gel is detectable. In some embodiments, the magnetite gel can be detected without application of a high-pass filter which can be required for the post-processing of conventional SWI results.

As is apparent to one of ordinary skill in the art, the invention can be implemented within any type of MRI device. The MRI device can be any MRI device as is known in the art. The MRI device can be a permanent magnet MRI. The MRI device can have a field strength at 1.0 Tesla. The MRI device can have a vertical $B_0$ field direction (e.g., perpendicular to a long axis of cylindrical sample tubes). The MRI device can be an MRI scanner from Aspect Imaging (Shoham, Isreal). The transmit/receive RF coils can be solenoids. The transmit/receive RF coils can be solenoids with 35 mm i.d.

Figure 5B:
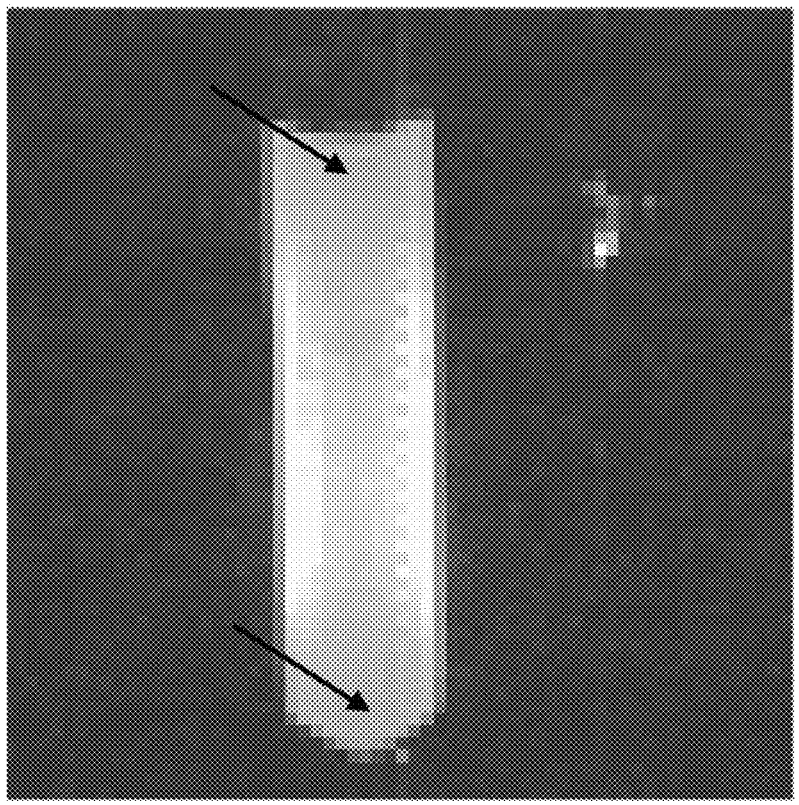
FIG. 5A and FIG. 5B show examples of MRI images of a tissue obtained with a first pulse sequence and a second pulse sequence, according to some embodiments of the invention.
Figure 5A:
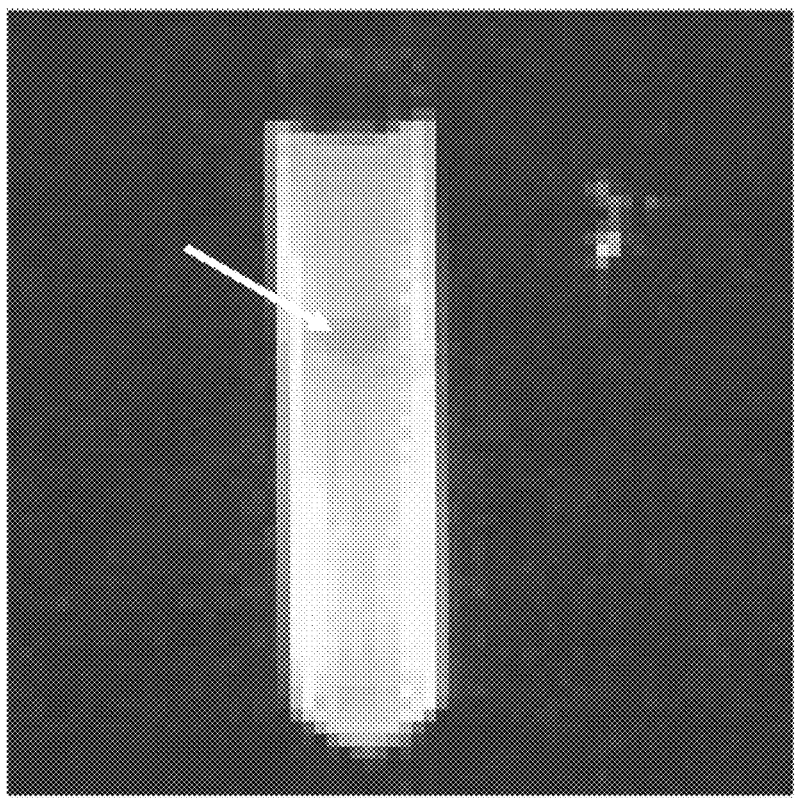

Reference is made to FIGS. 5A and 5B, which show examples of MRI images of a tissue (e.g., a sample) obtained with a first pulse sequence and a second pulse sequence, according to some embodiments of the invention. The sample includes a magnetite gel phantom containing 2.95 μg iron oxide powder per ml gel with a Δχ to the surrounding background gel of 0.14 ppm, which is approximately equal to the expected susceptibility difference between venous blood and surrounding tissue. The effective TE for the MRI images is 28 ms.

FIG. 5A shows an MRI image for a particular slice from the first echo (n=1) of a 3-dimensional multi-echo SE (MESE) acquisition, using the following acquisition parameters: 64×64×13 acquisition matrix, TR=400 ms, sampling dwell time=12 μs, FOV=45 mm, slice thickness=3.0 mm, IED=28 ms, total imaging time=5.5 minutes. FIG. 5B shows an MRI image for a second 3-dimensional MESE acquisition using the same parameters, except that in this acquisition IED=5.6 ms. The MRI image shows the same particular slide of FIG. 5A, reconstructed from the $5^{th}$ echo ('n'=5).

The magnetite gel (indicated by the white arrow) shows a reduced intensity on the MRI image on FIG. 5A compared to its intensity in FIG. 5B, on which it is barely distinguishable. The difference is weaker than that seen in FIGS. 3A and 3B which is due to, for example, a more dilute presence of the iron oxide particles in the sample of FIGS. 5A and 5B.

In contrast to the results shown in FIGS. 3A and 3B, the MRI images in FIGS. 5A and 5B reveal that the intensity of the background gel is not equal for the scans shown in parts FIG. 5A and FIG. 5B of the figure. As pointed out by the black arrows, there are regions in the sample in which the intensity in FIG. 5B is lower compared to FIG. 5A. This can be due to refocus pulse imperfections due to, for example, a non-uniform $B_1$ field. Such imperfection can be expected to have a stronger effect for echoes detected after a higher number of refocus pulses (in this case, 5 refocus pulses in FIG. 5B vs. a single refocus pulse in FIG. 5A). In some embodiments, the intensity difference in FIGS. 5A and 5B, that is not present in FIGS. 3A and 3B can be due to the fact that FIGS. 3A and 3B show MRI images of a region that is smaller then the region shown in FIGS. 5A and 5B, and closer to the center of a magnet of the MRI device, over which the $B_1$ field is relatively homogeneous. The MRI images in FIGS. 5A and 5B cover an entire length of the sample tube, where the edges approach the edges of the RF coil length, and stronger variations in $B_1$ are expected.

In some embodiments, the method can include performing during in-vivo applications. Some desirables for in-vivo applications can include good spatial resolution, thin and contiguous slices (which can requires 3-dimensional acquisition protocols), and/or reasonably short scan time, for example, slice thickness of the order of 2-3 mm, spatial resolution of the order of 1 mm, and scan times of the order of 5-10 minutes. Conventional SWI can use GRE sequences where these requirements are met without too much difficulty. SE sequences (particularly their 3-dimensional versions) can be usually much more time-consuming to acquire MRI images. One approach for overcoming this problem can include the application of various methods of performance time reduction such as the use of multiple receive coils and/or compressed sensing. In some embodiments, a generated pulse sequence can enables rapid (e.g., 5-10 minutes) acquisition for both the required n=1, and n=n' scans.

Figure 6:
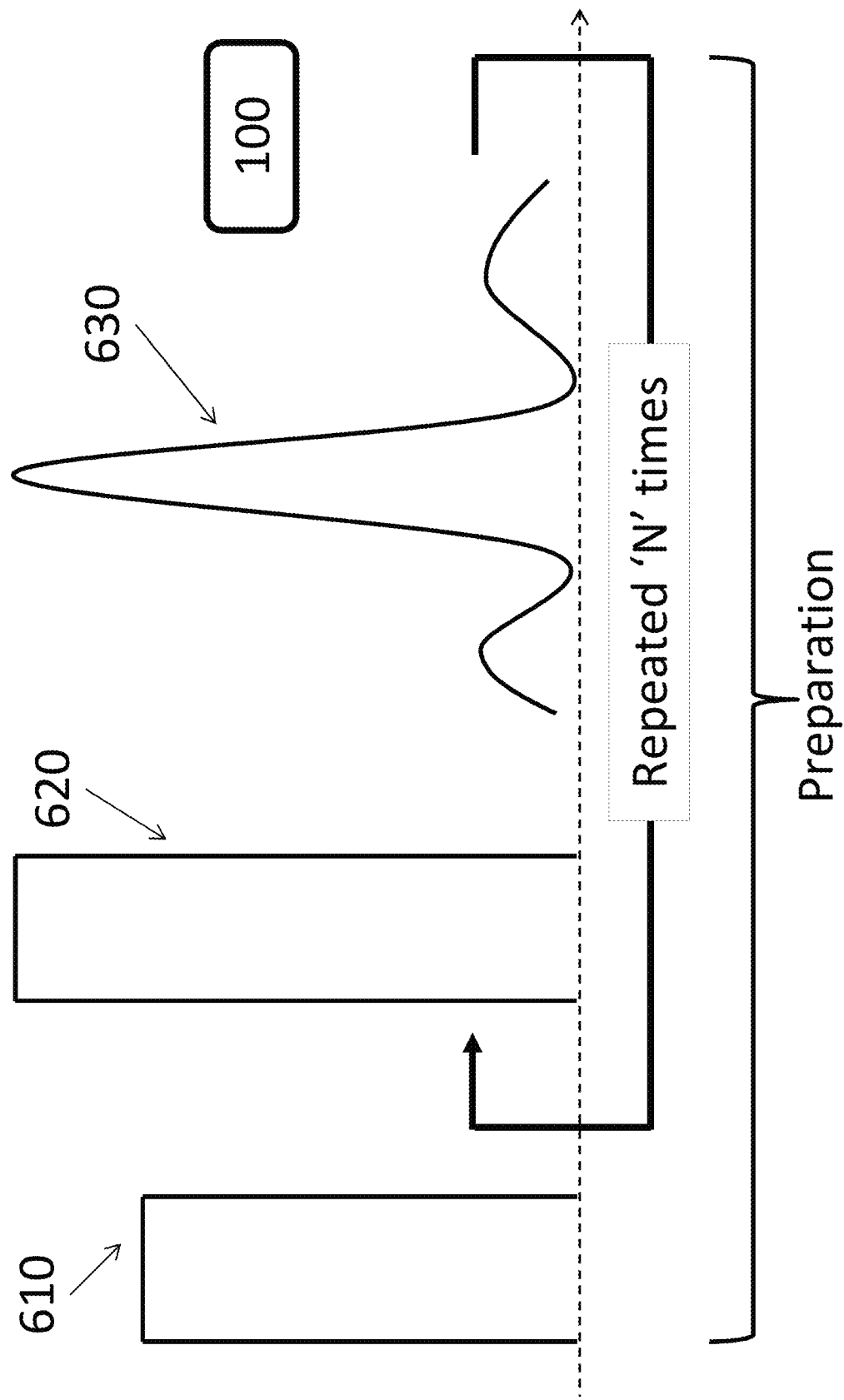
FIG. 6 shows another pulse sequence for spin echo MRI, according to some embodiments of the invention.

Reference is made to FIG. 6, which shows a pulse sequence for spin echo MRI, for implementation of susceptibility imaging spin-echo, according to some embodiments of the invention. The pulse sequence can include a preparation portion and a readout portion. The preparation portion can include signal 630 (A0) that can follow an excitation pulse 610 and a refocus pulse 620. The signal 630 can have a high sensitivity to local internal gradients when n=1, and much lower sensitivity to such gradients when n=n'. The readout portion can include a rapid, segmented FSE sequence, using center-out phase-encoding and minimal IED and TE (e.g., minimal IED and TE can be 5 ms).

In the preparation portion (e.g, between the n=1 and n=n' scans) the transverse magnetization is prepared with T2-weighting which has either low sensitivity (n=n'), or high sensitivity (n=1) to internal gradients. The prepared portion can be further refocused by a FSE train (e.g., repeated 'N' times) for creating 2D or 3D MRI images. In some embodiments, in order to, for example, preserve the contrast created by the preparation, the FSE sequence can be acquired with center-out phase encoding and an effective TE value which is as short as possible. The sequence can be applied in 3D mode, in which case the IED in both the preparation and readout parts can be minimized by using non-selective rectangular RF pulses.

The sequence shown in FIG. 6 can have the following advantages: first, it can enable relatively short imaging times even in 3D mode (the acquisition can be combined with multiple-coil and compressed sensing for additional savings in scan time), and second, the fact that the readout portion of the sequence can be identical for the n=1 and n=n' acquisitions, which can assure that regions where internal susceptibility gradients are small can have the same absolute intensities for both acquisitions.

Unless explicitly stated, the method embodiments described herein are not constrained to a particular order or sequence. Additionally, some of the described method embodiments or elements thereof can occur or be performed simultaneously, at the same point in time, or concurrently.

Various embodiments have been presented. Each of these embodiments may of course include features from other embodiments presented, and embodiments not specifically described may include various features described herein.

The invention claimed is:

1. A method of detecting a portion within a tissue that has a variation of local magnetic susceptibility, the method comprising:
   transmitting, by a magnetic resonance imaging (MRI) device, a first spin-echo pulse sequence to the tissue, wherein the first spin-echo pulse sequence comprises a first number of refocus pulses and a first echo time (TE) value, wherein the MRI device has a nonhomogeneous magnetic field in a measurement volume such that, if conventional susceptibility-weighted-imaging were to be performed using the MRI device on the tissue located in the measurement volume, phase shifts caused by the variation of local magnetic susceptibility would need to be larger than phase shifts caused by the nonhomogeneous magnetic field in order to detect such variation, making conventional susceptibility-weighted imaging unreliable for detecting such variation of local magnetic susceptibility using such MRI device;
   obtaining, by the MRI device, a first image of the tissue;
   transmitting, by the MRI device, a second spin-echo pulse sequence to the tissue, wherein the second spin-echo pulse sequence comprises a second number of refocus pulses and a second TE value;
   obtaining, by the MRI device, a second image of the tissue;
   determining, by the MRI device, one or more locations within the second image of the tissue having a signal intensity that is different than the signal intensity of the same one or more locations within the first image of the tissue; and
   identifying, by the MRI device, a portion of tissue that has a varied local magnetic susceptibility based on the determined one or more locations within the second image of the tissue,
   wherein the first number of refocus pulses and the second number of refocus pulses are different, and
   wherein neither the first image nor the second image are based on a signal with a non-zero phase shift caused by the nonhomogeneous magnetic field.

2. The method of claim 1, wherein the first TE value and the second TE value are different.

3. The method of claim 1, wherein identifying the portion of tissue further comprises identifying a location within the tissue where an effective TE of the first pulse sequence and second pulse sequence are identical.

4. The method of claim 1, wherein identifying the portion of the tissue further comprises applying a correction matrix to the first image of the tissue and the second image of the tissue, and wherein the correction matrix is based on at least two calibration images taken using the MRI device.

5. The method of claim 1, wherein the first number of refocus pulses is less than the second number of refocus pulses.

6. The method of claim 1, wherein the second number of refocus pulses is less than the first number of refocus pulses.

7. The method of claim 1, further comprising acquiring one or more calibration images from a phantom which is void of internal susceptibility gradients.

8. The method of claim 7, further comprising:
   generating a correction matrix based on the one or more calibration images; and applying the generated correction matrix on at least one of the first image of the tissue and the second image the second image of the tissue.

9. The method of claim 1, wherein the tissue is a brain.

10. The method of claim 1, wherein the MRI is a permanent magnet MRI.

11. The method of claim 1, further comprising transmitting the identified portion of the tissue to a display.

12. The method of claim 1, wherein the signal intensity difference between the first image of the tissue and the second image of the tissue is caused by the strength of local magnetic susceptibility gradients.

13. The method of claim 1, further comprising:
generating an image mask;
weighting the first image of the tissue and the second image of the tissue with relaxation time T2; and
superimposing the image mask on the weighted first image of the tissue and the second image of the tissue.

14. The method of claim 1, wherein at least one of the first spin-echo pulse sequence and the second spin-echo pulse sequence is a 3-dimensional sequence.

15. The method of claim 1, further comprising applying a fast spin-echo sequence to the tissue to obtain a readout of the tissue.

16. The method of claim 15, further comprising applying multiple spin-echo pulse sequences during a predetermined time period prior to applying the fast spin-echo sequence.

17. The method of claim 1, wherein each of the first and second images of the tissue are based on a plurality of spin echoes.

18. A system for detecting a portion within a tissue that has a variation of local magnetic susceptibility, comprising:
a magnetic resonance imaging (MRI) device having a nonhomogeneous magnetic field in a measurement volume such that, if conventional susceptibility-weighted-imaging were to be performed using the MRI device on a tissue located in the measurement volume, phase shifts caused by the variation of local magnetic susceptibility would need to be larger than phase shifts caused by the nonhomogeneous magnetic field in order to detect such variation, making conventional susceptibility-weighted imaging unreliable for detecting such variation of local magnetic susceptibility using such MRI device, the MRI device further configured to:
transmit a first spin-echo pulse sequence to the tissue, wherein the first spin-echo pulse sequence comprises a first number of refocus pulses and a first echo time (TE) value;
obtain a first image of the tissue;
transmit a second spin-echo pulse sequence to the tissue, wherein the second spin-echo pulse sequence comprises a second number of refocus pulses and a second TE value;
obtain a second image of the tissue;
determine one or more locations within the second image of the tissue having a signal intensity that is different than the signal intensity of the same one or more locations within the first image of the tissue; and
identify a portion of tissue that has a varied local magnetic susceptibility based on the determined one or more locations within the second image of the tissue,
wherein the first number of refocus pulses and the second number of refocus pulses are different, and
wherein neither the first image nor the second image are based on a signal with a non-zero phase shift caused by the nonhomogeneous magnetic field.

19. The system of claim 18, wherein the MRI device is further configured to identify a location within the tissue where an effective TE of the first pulse sequence and second pulse sequence are identical.

20. The system of claim 18, wherein the MRI device is further configured to apply a correction matrix to the first image of the tissue and the second image of the tissue, and wherein the correction matrix is based on at least two calibration images taken using the MRI device.

21. The system of claim 18, wherein the MRI device is further configured to acquire one or more calibration images from a phantom which is void of internal susceptibility gradients.

22. The system of claim 21, wherein the MRI device is further configured to:
generate a correction matrix based on the one or more calibration images; and
apply the generated correction matrix on at least one of the first image of the tissue and the second image the second image of the tissue.

23. The system of claim 18, wherein the MRI is a permanent magnet MRI.

24. The system of claim 18, wherein the MRI device is further configured to transmit the identified portion of the tissue to a display.

25. The system of claim 18, wherein the signal intensity difference between the first image of the tissue and the second image of the tissue is caused by the strength of local magnetic susceptibility gradients.

26. The system of claim 18, wherein the MRI device is further configured to:
generate an image mask;
weight the first image of the tissue and the second image of the tissue with relaxation time T2; and
superimpose the image mask on the weighted first image of the tissue and the second image of the tissue.

27. The system of claim 18, wherein at least one of the first spin-echo pulse sequence and the second spin-echo pulse sequence is a 3-dimensional sequence.

28. The system of claim 18, wherein the MRI device is further configured to apply a fast spin-echo sequence to the tissue to obtain a readout of the tissue.

29. The system of claim 28, wherein the MRI device is further configured to apply multiple spin-echo pulse sequences during a predetermined time period prior to applying the fast spin-echo sequence.

30. The system of claim 18, wherein each of the first and second images of the tissue are based on a plurality of spin echoes.

31. A non-transitory computer program product for detection of a portion within a tissue that has a variation of local magnetic susceptibility, the non-transitory computer program product comprising instructions which, when executed by a computer, cause the computer to:
cause one or more components of a magnetic resonance imaging (MRI) device to transmit a first spin-echo pulse sequence to the tissue, wherein the first spin-echo pulse sequence comprises a first number of refocus pulses and a first echo time (TE) value, wherein the MRI device has a nonhomogeneous magnetic field in a measurement volume such that, if conventional susceptibility-weighted-imaging were to be performed using the MRI device on the tissue located in the measurement volume, phase shifts caused by the variation of local magnetic susceptibility would need to be larger than phase shifts caused by the nonhomogeneous magnetic field in order to detect such variation, making conventional susceptibility-weighted imaging unreliable for detecting such variation of local magnetic susceptibility using such MRI device;

obtain a first image of the tissue;

cause the one or more components of the MRI device to transmit a second spin-echo pulse sequence to the tissue, wherein the second spin-echo pulse sequence comprises a second number of refocus pulses and a second TE value;

obtain a second image of the tissue;

determine one or more locations within the second image of the tissue having a signal intensity that is different than the signal intensity of the same one or more locations within the first image of the tissue; and identify a portion of tissue that has a varied local magnetic susceptibility based on the determined one or more locations within the second image of the tissue, wherein the first number of refocus pulses and the second number of refocus pulses are different, and wherein neither the first image nor the second image are based on a signal with a non-zero phase shift caused by the nonhomogeneous magnetic field.

32. The non-transitory computer program product of claim 31, wherein each of the first and second images of the tissue are based on a plurality of spin echoes.

* * * * *